US012361959B2

(12) United States Patent
Xiao et al.

(10) Patent No.: US 12,361,959 B2
(45) Date of Patent: Jul. 15, 2025

(54) SPEECH ENHANCEMENT METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Yupeng Shi, Shenzhen (CN); Meng Wang, Shenzhen (CN); Shidong Shang, Shenzhen (CN); Zurong Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 345 days.

(21) Appl. No.: 17/977,772

(22) Filed: Oct. 31, 2022

(65) Prior Publication Data

US 2023/0050519 A1 Feb. 16, 2023

Related U.S. Application Data

(63) Continuation of application No. PCT/CN2022/074225, filed on Jan. 27, 2022.

(30) Foreign Application Priority Data

Feb. 8, 2021 (CN) ......................... 202110171244.6

(51) Int. Cl.
*G10L 21/0264* (2013.01)
*G10L 21/0232* (2013.01)
(Continued)

(52) U.S. Cl.
CPC ...... *G10L 21/0264* (2013.01); *G10L 21/0232* (2013.01); *G10L 21/034* (2013.01); *G10L 21/0364* (2013.01); *G10L 25/30* (2013.01)

(58) Field of Classification Search
CPC ............. G10L 21/0264; G10L 21/0232; G10L 21/034; G10L 21/0364; G10L 25/30; G10L 21/02
See application file for complete search history.

(56) References Cited

U.S. PATENT DOCUMENTS 4,586,193 A * 4/1986 Seiler ...................... G10L 25/00 704/268
5,748,838 A * 5/1998 Stevens ................... G10L 13/04 704/E13.005

(Continued)

FOREIGN PATENT DOCUMENTS

CN 101616059 A * 12/2009 ........... G10L 19/005
CN 107248411 A 10/2017

(Continued)

OTHER PUBLICATIONS

Perrotin, O., & McLoughlin, I. V. (2020). Glottal flow synthesis for whisper-to-speech conversion. IEEE/ACM Transactions on Audio, Speech, and Language Processing, 28, 889-900. (Year: 2020).*

(Continued)

*Primary Examiner* — Bhavesh M Mehta
*Assistant Examiner* — Philip H Lam
(74) *Attorney, Agent, or Firm* — ANOVA LAW GROUP, PLLC

(57) ABSTRACT

A speech enhancement method includes: determining a glottal parameter corresponding to a target speech frame according to a frequency domain representation of the target speech frame; determining a gain corresponding to the target speech frame according to a gain corresponding to a historical speech frame of the target speech frame; determining an excitation signal corresponding to the target speech frame according to the frequency domain representation of the target speech frame; and synthesizing the glottal parameter corresponding to the target speech frame, the gain corre- (Continued)

sponding to the target speech frame, and the excitation signal corresponding to the target speech frame, to obtain an enhanced speech signal corresponding to the target speech frame.

19 Claims, 7 Drawing Sheets

(51) Int. Cl.

| | |
|---|---|
| ***G10L 21/034*** | (2013.01) |
| ***G10L 21/0364*** | (2013.01) |
| ***G10L 25/30*** | (2013.01) |

(56) References Cited

U.S. PATENT DOCUMENTS

| | | | | |
|---|---|---|---|---|
| 6,035,270 | A * | 3/2000 | Hollier | G10L 25/69 704/E19.009 |
| 10,186,251 | B1 * | 1/2019 | Mohammadi | G10L 15/26 |
| 10,354,659 | B2 | 7/2019 | Liu et al. | |
| 2002/0026315 | A1 * | 2/2002 | Miranda | G10L 13/04 704/E13.007 |
| 2005/0165608 | A1 * | 7/2005 | Suzuki | G10L 19/06 704/E19.024 |
| 2007/0088546 | A1 * | 4/2007 | Song | G10L 19/265 704/E19.046 |
| 2008/0288258 | A1 * | 11/2008 | Jiang | G10L 25/48 704/E13.001 |
| 2012/0072211 | A1 * | 3/2012 | Edgington | G10L 25/78 704/E15.001 |
| 2014/0156280 | A1 * | 6/2014 | Ranniery | G10L 13/08 704/260 |
| 2015/0006163 | A1 * | 1/2015 | Liu | G10L 19/00 704/205 |
| 2015/0149157 | A1 * | 5/2015 | Atti | G10L 19/0204 704/205 |
| 2015/0348535 | A1 * | 12/2015 | Dachiraju | G10L 13/02 704/266 |
| 2016/0027430 | A1 * | 1/2016 | Dachiraju | G10L 13/02 704/262 |
| 2016/0343366 | A1 * | 11/2016 | Fructuoso | G10L 13/08 |
| 2018/0053087 | A1 | 2/2018 | Fukuda | |
| 2018/0330713 | A1 * | 11/2018 | Hoory | G10L 13/033 |
| 2018/0366138 | A1 * | 12/2018 | Ramprashad | G10L 21/0208 |
| 2019/0311730 | A1 * | 10/2019 | Looney | G10L 25/90 |
| 2019/0325860 | A1 * | 10/2019 | Faubel | G10L 25/21 |
| 2019/0341067 | A1 * | 11/2019 | Rajendran | G10L 25/30 |
| 2020/0082805 | A1 * | 3/2020 | Zhang | G10L 13/027 |
| 2020/0204135 | A1 | 6/2020 | Qin et al. | |
| 2021/0098003 | A1 * | 4/2021 | Schnabel | G10L 19/06 |
| 2022/0215848 | A1 | 7/2022 | Xiao et al. | |
| 2022/0230646 | A1 | 7/2022 | Xiao et al. | |
| 2023/0233136 | A1 * | 7/2023 | Lee | A61B 5/4064 600/301 |

FOREIGN PATENT DOCUMENTS

| | | | |
|---|---|---|---|
| CN | 108369803 | A | 8/2018 |
| CN | 110018808 | A | 7/2019 |
| CN | 111554309 | A | 8/2020 |
| CN | 111554322 | A | 8/2020 |
| CN | 111554323 | A | 8/2020 |
| CN | 113571079 | A | 10/2021 |
| EP | 4261825 | A1 | 10/2023 |
| EP | 4297025 | A1 | 12/2023 |
| WO | 2004040555 | A1 | 5/2004 |

OTHER PUBLICATIONS

Degottex, G. (2010). Glottal source and vocal-tract separation (Doctoral dissertation, Université Pierre et Marie Curie—Paris VI) (Year: 2010).*

Juvela, L., Bollepalli, B., Tsiaras, V., & Alku, P. (2019). Glotnet—a raw waveform model for the glottal excitation in statistical parametric speech synthesis. IEEE/ACM Transactions on Audio, Speech, and Language Processing, 27(6), 1019-1030. (Year: 2019).*

Raitio, T., Suni, A., Yamagishi, J., Pulakka, H., Nurminen, J., Vainio, M., & Alku, P. (2010). HMM-based speech synthesis utilizing glottal inverse filtering. IEEE transactions on audio, speech, and language processing, 19(1), 153-165. (Year: 2010).*

Cabral, J. P., Richmond, K., Yamagishi, J., & Renals, S. (2014). Glottal spectral separation for speech synthesis. IEEE Journal of Selected Topics in Signal Processing, 8(2), 195-208. (Year: 2014).*

The European Patent Office (EPO) The Extended European Search Report for 22749017.4 May 22, 2024 8 Pages.

The Japan Patent Office (Jpo) Notification of Reasons for Refusal for Application No. 2023-538919 and Translation Sep. 3, 2024 7 Pages.

The World Intellectual Property Organization (WIPO) International Search Report for PCT/CN2022/074225 Apr. 20, 2022 8 Pages (including translation).

* cited by examiner

SPEECH ENHANCEMENT METHOD AND APPARATUS, DEVICE, AND STORAGE MEDIUM

CROSS-REFERENCES TO RELATED APPLICATIONS

This application is a continuation application of PCT Patent Application No. PCT/CN2022/074225, entitled "SPEECH ENHANCEMENT METHOD AND APPARATUS, AND DEVICE AND STORAGE MEDIUM" and filed on Jan. 27, 2022, which claims priority to Chinese Patent Application No. 202110171244.6, entitled "SPEECH ENHANCEMENT METHOD AND APPARATUS, DEVICE, AND STORAGE MEDIUM" filed with the China National Intellectual Property Administration on Feb. 8, 2021, the entire contents of both of which are incorporated herein by reference.

FIELD OF THE TECHNOLOGY

The present disclosure relates to the field of speech processing technologies, and specifically, to a speech enhancement method and apparatus, a device, and a storage medium.

BACKGROUND OF THE DISCLOSURE

Due to the convenience and timeliness of voice communication, voice communication is increasingly widely applied. For example, speech signals are transmitted between conference participants of cloud conferencing. However, in voice communication, noise may be mixed in speech signals, and the noise mixed in the speech signals leads to poor communication quality and greatly affects the auditory experience of the user. Therefore, how to enhance the speech to remove noise is a technical problem urgently needs to be resolved in the related art.

SUMMARY

Embodiments of the present disclosure provide a speech enhancement method and apparatus, a device, and a storage medium, to implement speech enhancement and improve quality of a speech signal.

Other features and advantages of the present disclosure become obvious through the following detailed descriptions, or may be partially learned through the practice of the present disclosure.

According to an aspect of the embodiments of the present disclosure, a speech enhancement method is provided, including: determining a glottal parameter corresponding to a target speech frame according to a frequency domain representation of the target speech frame; determining a gain corresponding to the target speech frame according to a gain corresponding to a historical speech frame of the target speech frame; determining an excitation signal corresponding to the target speech frame according to the frequency domain representation of the target speech frame; and synthesizing the glottal parameter corresponding to the target speech frame, the gain corresponding to the target speech frame, and the excitation signal corresponding to the target speech frame, to obtain an enhanced speech signal corresponding to the target speech frame.

According to another aspect of the present disclosure embodiment, a speech enhancement apparatus is provided, including: a glottal parameter prediction module, configured to determine a glottal parameter corresponding to a target speech frame according to a frequency domain representation of the target speech frame; a gain prediction module, configured to determine a gain corresponding to the target speech frame according to a gain corresponding to a historical speech frame of the target speech frame; an excitation signal prediction module, configured to determine an excitation signal corresponding to the target speech frame according to the frequency domain representation of the target speech frame; and a synthesis module, configured to perform synthesis on the glottal parameter corresponding to the target speech frame, the gain corresponding to the target speech frame, and the excitation signal corresponding to the target speech frame, to obtain an enhanced speech signal corresponding to the target speech frame.

According to another aspect of the present disclosure embodiment, an electronic device is provided, including: a processor; a memory, storing computer-readable instructions, the computer-readable instructions, when executed by the processor, implementing the speech enhancement method described above.

According to another aspect of the present disclosure embodiment, a non-transitory computer-readable storage medium is provided, storing computer-readable instructions, the computer-readable instructions, when executed by a processor, implementing the speech enhancement method described above.

It is to be understood that the foregoing general descriptions and the following detailed descriptions are merely for illustration and explanation purposes and are not intended to limit the present disclosure.

BRIEF DESCRIPTION OF THE DRAWINGS

The accompanying drawings herein, which are incorporated into the specification and constitute a part of this specification, show embodiments that conform to the present disclosure, and are used for describing a principle of the present disclosure together with this specification. Apparently, the accompanying drawings in the following description show merely some embodiments of the present disclosure, and a person of ordinary skill in the art may still derive other drawings from the accompanying drawings without creative efforts. In the accompanying drawings.

DESCRIPTION OF EMBODIMENTS

Figure 1:
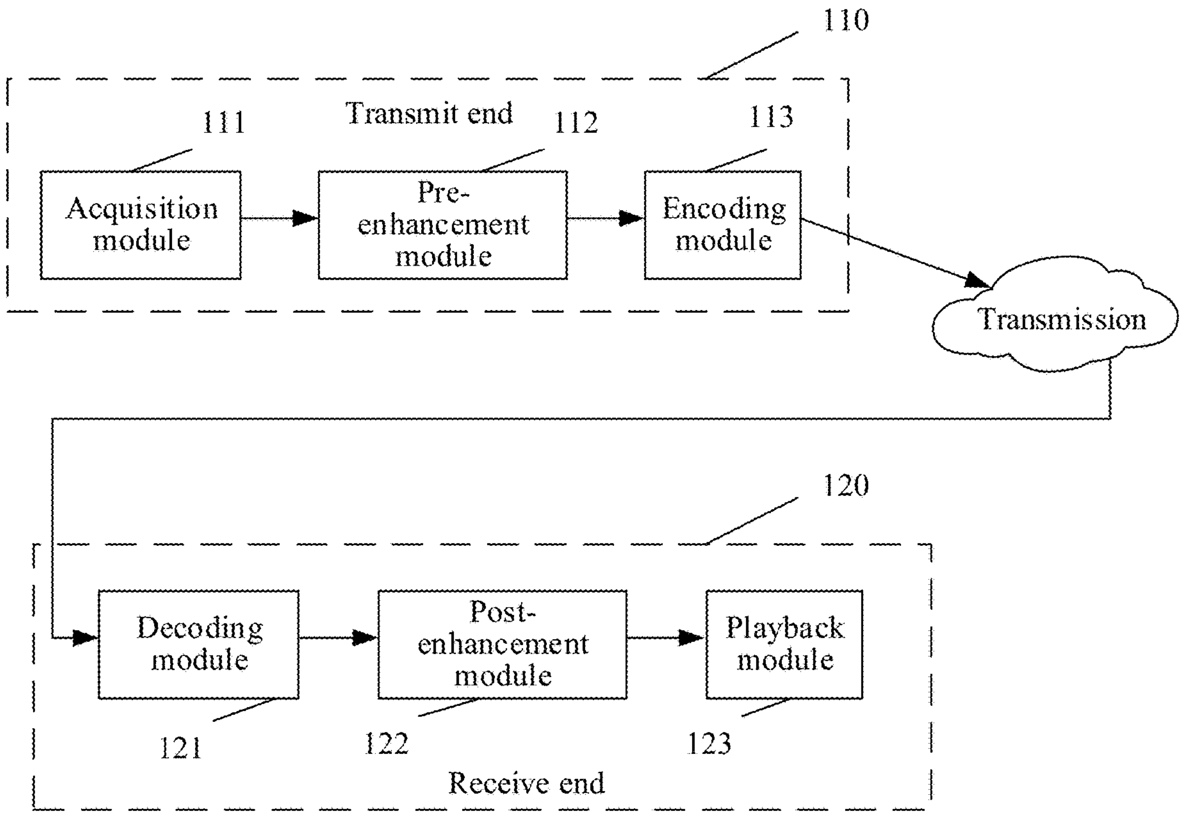
FIG. 1 is a schematic diagram of a voice communication link in a Voice over Internet Protocol (VoIP) system according to one embodiment.

Now, exemplary implementations are described comprehensively with reference to the accompanying drawings. However, the exemplary implementations can be implemented in various forms and are not to be understood as being limited to the examples described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a full understanding of the embodiments of the present disclosure. However, a person skilled in the art is to be aware of that, the technical solutions in the present disclosure may be implemented without one or more of the particular details, or other methods, unit, apparatus, or step may be adopted. In other cases, well-known methods, apparatuses, implementations, or operations are not shown or described in detail, to avoid obscuring the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between associated objects.

Noise in a speech signal may greatly reduce the speech quality and affect the auditory experience of a user. Therefore, to improve the quality of the speech signal, it is necessary to enhance the speech signal to remove the noise as much as possible and keep an original speech signal (that is, a pure signal excluding noise) in the signal. To enhance a speech, solutions of the present disclosure are provided.

The solutions of the present disclosure are applicable to an application scenario of a voice call, for example, voice communication performed through an instant messaging application or a voice call in a game application. Specifically, speech enhancement may be performed according to the solution of the present disclosure at a transmit end of a speech, a receive end of the speech, or a server end providing a voice communication service.

The cloud conferencing is an important part of the online office. In the cloud conferencing, after acquiring a speech signal of a speaker, a sound acquisition apparatus of a participant of the cloud conferencing needs to transmit the acquired speech signal to other conference participants. This process involves transmission of the speech signal between a plurality of participants and playback of the speech signal. If a noise signal mixed in the speech signal is not processed, the auditory experiences of the conference participants are greatly affected. In such a scenario, the solutions of the present disclosure are applicable to enhancing the speech signal in the cloud conferencing, so that a speech signal heard by the conference participants is the enhanced speech signal, and the quality of the speech signal is improved.

The cloud conferencing is an efficient, convenient, and low-cost conference form based on the cloud computing technology. A user can quickly and efficiently share speeches, data files, and videos with teams and customers around the world synchronously by only performing simple and easy operations through an Internet interface, and for complex technologies, such as transmission and processing of data, in the conference, the cloud conferencing provider helps the user to perform operations.

At present, the cloud conferencing in China mainly focuses on service content with the Software as a Service (SaaS) mode as the main body, including service forms such as a telephone, a network, and a video. Cloud computing-based video conferencing is referred to as cloud conferencing. In the cloud conferencing era, transmission, processing, and storage of data are all performed by computer resources of the video conference provider. A user can conduct an efficient remote conference by only opening a client and entering a corresponding interface without purchasing expensive hardware and installing cumbersome software.

The cloud conferencing system supports multi-server dynamic cluster deployment, and provides a plurality of high-performance servers, to greatly improve the stability, security, and usability of the conference. In recent years, since the video conference can greatly improve communication efficiency, continuously reduce communication costs, and upgrade the internal management level, the video conference is welcomed by many users, and has been widely applied to various fields such as government, military, traffic, transportation, finance, operators, education, and enterprises.

FIG. 1 is a schematic diagram of a voice communication link in a VoIP system according to one embodiment. As shown in FIG. 1, based on a network connection between a transmit end 110 and a receive end 120, the transmit end 110 and the receive end 120 can perform speech transmission.

As shown in FIG. 1, the transmit end 110 includes an acquisition module 111, a pre-enhancement module 112, and an encoding module 113. The acquisition module 111 is configured to acquire a speech signal, and can convert an acquired acoustic signal into a digital signal. The pre-enhancement module 112 is configured to enhance the acquired speech signal to remove noise from the acquired speech signal and improve the quality of the speech signal. The encoding module 113 is configured to encode the enhanced speech signal to improve interference immunity of the speech signal during transmission. The pre-enhancement module 112 can perform speech enhancement according to the method of the present disclosure. After being enhanced, the speech can be further encoded, compressed, and transmitted. In this way, it can be ensured that the signal received by the receive end is not affected by the noise any more.

The receive end 120 includes a decoding module 121, a post-enhancement module 122, and a playback module 123. The decoding module 121 is configured to decode the received encoded speech signal to obtain a decoded speech signal. The post-enhancement module 122 is configured to enhance the decoded speech signal. The playback module 123 is configured to play the enhanced speech signal. The post-enhancement module 122 can also perform speech enhancement according to the method of the present disclosure. In some embodiments, the receive end 120 may also include a sound effect adjustment module. The sound effect adjustment module is configured to perform sound effect adjustment on the enhanced speech signal.

In one embodiment, speech enhancement can be performed only on the receive end 120 or the transmit end 110 according to the method of the present disclosure, and certainly, speech enhancement may also be performed on both the transmit end 110 and the receive end 120 according to the method of the present disclosure.

In some application scenarios, in addition to supporting VoIP communication, the terminal device in the VoIP system can also support another third-party protocol, for example, the Public Switched Telephone Network (PSTN) circuit-switched domain phone, but cannot perform speech enhancement in the PSTN service, cannot be performed, and in such a scenario, can perform speech enhancement according to the method of the present disclosure as a terminal of the receive end.

Before the solutions of the present disclosure are described in detail, it is necessary to introduce generation of a speech signal. A speech signal is generated by physiological movement of the human vocal organs under the control of the brain, that is, at the trachea, a noise-like impact signal (equivalent to an excitation signal) with specific energy is generated. The impact signal impacts the vocal cord of a person (the vocal cord is equivalent to a glottal filter), to generate quasi-periodic opening and closing. Through the amplification performed by the mouth, a sound is made (a speech signal is outputted).

Figure 2:
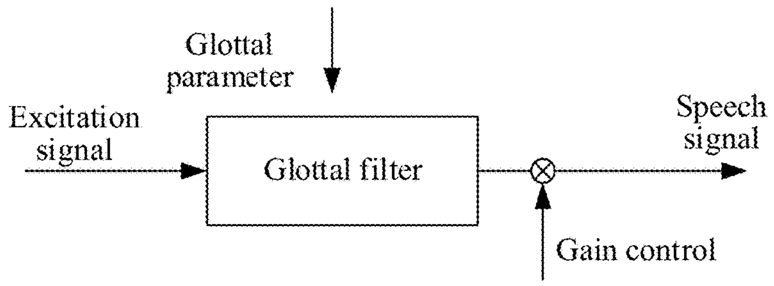
FIG. 2 is a schematic diagram of a digital model of generation of a speech signal.

FIG. 2 is a schematic diagram of a digital model of generation of a speech signal. The generation process of the speech signal can be described by using the digital model. As shown in FIG. 2, after the excitation signal impacts the glottal filter, a speech signal is outputted after gain control is performed. The glottal filter is defined by a glottal parameter. This process can be expressed by using the following formula:

$$x(n)=G\cdot r(n)\cdot ar(n) \quad \text{(formula 1)}$$

where x(n) represents an inputted speech signal, G represents a gain, and may also be referred to as a linear prediction gain, r(n) represents an excitation signal, and ar(n) represents a glottal filter.

Figure 3A:
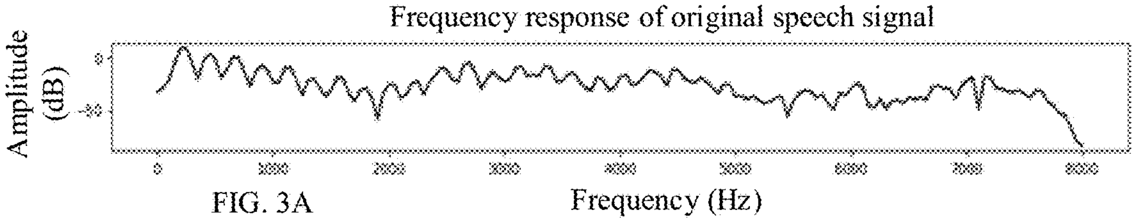
FIG. 3A is a schematic diagram of a frequency response of the original speech signal.
Figure 3B:
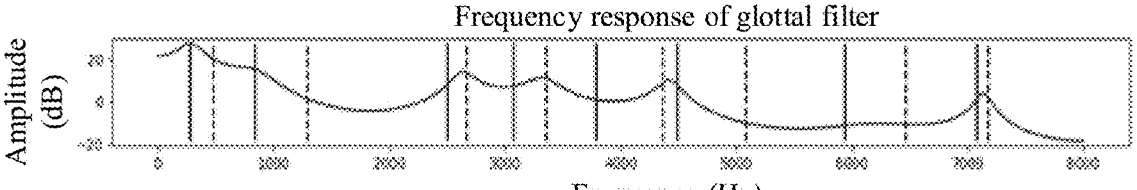
FIG. 3B is a schematic diagram of a frequency response of a glottal filter obtained by decomposing the original speech signal.
Figure 3C:
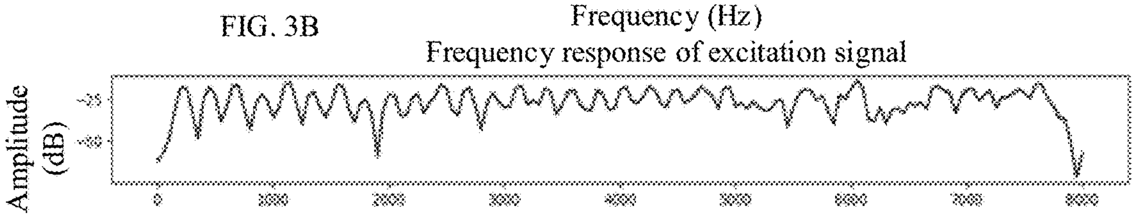
FIG. 3C is a schematic diagram of a frequency response of an excitation signal obtained by decomposing the original speech signal.

FIGS. 3A-3C show frequency responses of an excitation signal and a glottal filter obtained by decomposing an original speech signal. FIG. 3A is a schematic diagram of a frequency response of the original speech signal. FIG. 3B is a schematic diagram of a frequency response of a glottal filter obtained by decomposing the original speech signal. FIG. 3C is a schematic diagram of a frequency response of an excitation signal obtained by decomposing the original speech signal. As shown in FIGS. 3A-3C, a fluctuating part in a schematic diagram of a frequency response of an original speech signal corresponds to a peak position in a schematic diagram of a frequency response of a glottal filter. An excitation signal is equivalent to a residual signal after linear prediction (LP) analysis is performed on the original speech signal, and therefore, its corresponding frequency response is relatively smooth.

As can be seen from the above, an excitation signal, a glottal filter, and a gain can be obtained by decomposing an original speech signal (that is, a speech signal that does not include noise), and the excitation signal, the glottal filter, and the gain obtained by decomposition may be used for expressing the original speech signal. The glottal filter can be expressed by a glottal parameter. Conversely, when an excitation signal, a glottal parameter used for determining a glottal filter, and a gain that correspond to an original speech signal are known, then the original speech signal can be reconstructed according to the corresponding excitation signal, glottal filter, and gain.

The solution of the present disclosure is just based on this principle. A glottal parameter, an excitation signal, and gain corresponding to an original speech signal in a to-be-processed speech signal are predicted according to the speech signal. Then, speech synthesis is performed based on the obtained glottal parameter, excitation signal, and gain. The speech signal obtained by synthesis is equivalent to the original speech signal in the to-be-processed speech signal. Therefore, the signal obtained by synthesis is equivalent to a signal with noise removed. This process enhances the to-be-processed speech signal. Therefore, the signal obtained by synthesis may also be referred to as an enhanced speech signal corresponding to the to-be-processed speech signal.

Figure 4:
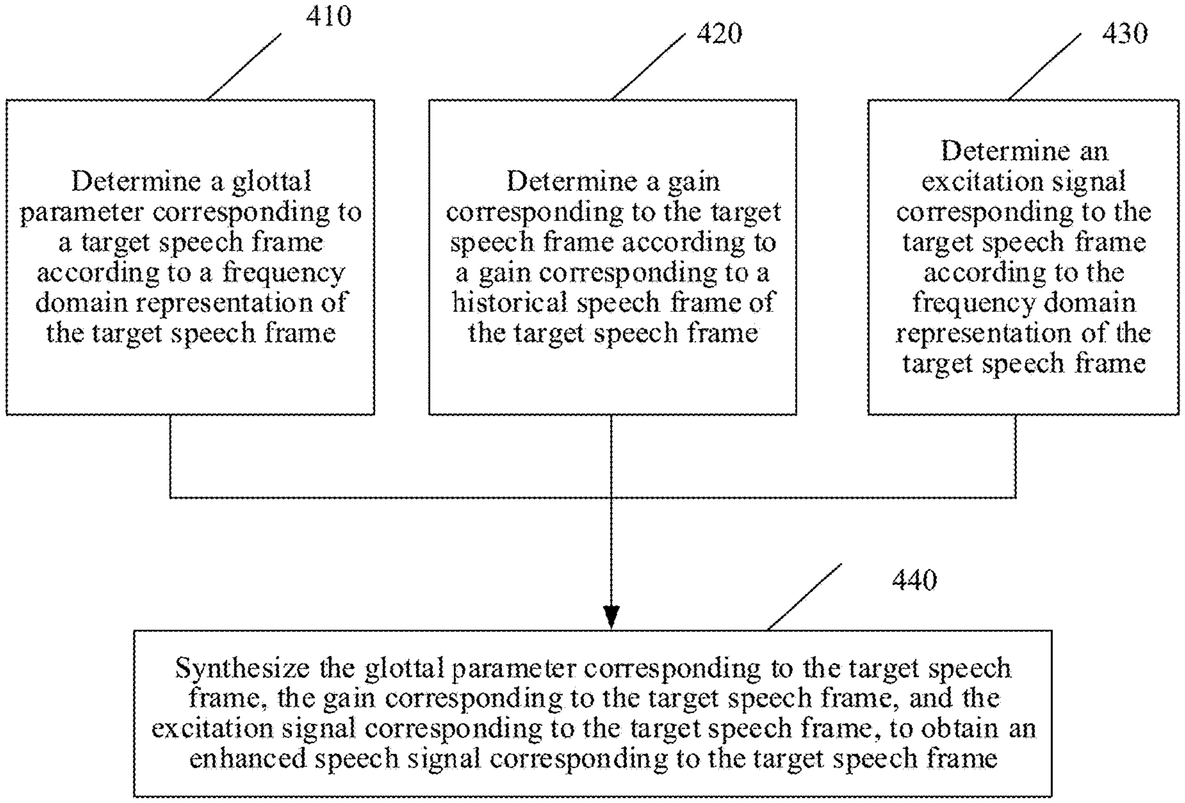
FIG. 4 is a flowchart of a speech enhancement method according to an embodiment of the present disclosure.

FIG. 4 is a flowchart of a speech enhancement method according to an embodiment of the present disclosure. This method may be performed by a computer device with computing and processing capabilities, for example, a server or a terminal, which is not specifically limited herein. Referring to FIG. 4, the method includes at least steps 410 to 440, specifically described as follows:

Step 410: Determine a glottal parameter corresponding to a target speech frame according to a frequency domain representation of the target speech frame.

The speech signal varies with time rather than steadily and randomly. However, the speech signal is strongly correlated in a short time. That is, the speech signal has short-time correlation. Therefore, in the solution of the present disclosure, a speech frame is used as a unit for speech enhancement. The target speech frame is a current to-be-enhanced speech frame.

The frequency domain representation of a target speech frame can be obtained by performing a time-frequency transform on a time domain signal of the target speech frame. The time-frequency transform may be, for example, a short-time Fourier transform (STFT). The frequency domain representation may be an amplitude spectrum, a complex spectrum, or the like, which is not specifically limited herein.

The glottal parameter refers to a parameter used for constructing a glottal filter. When the glottal parameter is determined, then the glottal filter is determined correspondingly. The glottal filter is a digital filter. The glottal parameter can be a linear predictive coding (LPC) coefficient or a line spectral frequency (LSF) parameter. A quantity of glottal parameters corresponding to the target speech frame is related to an order of the glottal filter. When the glottal filter is a K-order filter, the glottal parameter includes a K-order LSF parameter or a K-order LPC coefficient. The LSF parameter and the LPC coefficient can be converted into each other.

A p-order glottal filter may be expressed as:

$$A_p(z)=1+a_1z^{-1}+a_2z^{-2}+\ldots+a_pz^{-p} \quad \text{(formula 2)}$$

where $a_1, a_2, \ldots,$ and $a_p$ are LPC coefficients; p is an order of the glottal filter; and z is an input signal of the glottal filter.

Based on formula 2, if $$P(z)=A_p(z)-z^{-(p+1)}A_p(z^{-1}) \quad \text{(formula 3)}$$

$$Q(z)=A_p(z)+z^{-(p+1)}A_p(z^{-1}) \quad \text{(formula 4)}$$

it can be obtained that:

$$A_p(z)=\frac{P(z)+Q(z)}{2}. \quad \text{(formula 5)}$$

In the physical sense, P(z) and Q(z) respectively represent periodical variation laws of glottal opening and glottal closure. Roots of multinomials P(z) and Q(z) appear alternately on a complex plane, and are a series of angular frequencies distributed on a unit circle on the complex plane. The LSF parameter is angular frequencies corresponding to the roots of P(z) and Q(z) on the unit circle on the complex plane. The LSF parameter LSF(n) corresponding to the $n^{th}$ speech frame may be expressed as $\omega_n$. Certainly, the LSF parameter LSF(n) corresponding to the $n^{th}$ speech frame may also be directly expressed as a root of P(z) corresponding to the $n^{th}$ speech frame and a root of Q(z) corresponding to the $n^{th}$ speech frame. When roots of P(z) and Q(z) corresponding to the $n^{th}$ speech frame are defined as $\theta_n$, the LSF parameter corresponding to the $n^{th}$ speech frame is expressed as:

$$\omega_n=\tan^{-1}\left(\frac{Rel\{\theta_n\}}{Imag\{\theta_n\}}\right) \quad \text{(formula 6)}$$

where Rel$\{\theta_n\}$ represents a real part of a complex number $\theta_n$; and Imag$\{\theta_n\}$ represents an imaginary part of the complex number $\theta_n$.

In step 410, the glottal parameter prediction that is performed refers to predicting a glottal parameter used for reconstructing the original speech signal in the target speech frame. In an embodiment, the glottal parameter corresponding to the target speech frame can be predicted by using a trained neural network model.

In some embodiments of the present disclosure, step 410 includes: inputting the frequency domain representation of the target speech frame into a first neural network, the first neural network being obtained by training according to a frequency domain representation of a sample speech frame and a glottal parameter corresponding to the sample speech frame; and outputting, by the first neural network according to the frequency domain representation of the target speech frame, the glottal parameter corresponding to the target speech frame.

The first neural network refers to a neural network model used for performing glottal parameter prediction. The first neural network may be a model constructed by using a long short-term memory neural network, a convolutional neural network, a cyclic neural network, a fully-connected neural network, or the like, which is not specifically limited herein.

The frequency domain representation of a sample speech frame is obtained by performing a time-frequency transform on a time domain signal of the sample speech frame. The frequency domain representation may be an amplitude spectrum, a complex spectrum, or the like, which is not specifically limited herein.

In some embodiments of the present disclosure, a signal indicated by the sample speech frame may be obtained by combining a known original speech signal and a known noise signal. Therefore, when the original speech signal is known, linear predictive analysis can be performed on the original speech signal, to obtain glottal parameters corresponding to the sample speech frames.

During training, after the frequency domain representation of the sample speech frame is inputted into the first neural network, the first neural network performs glottal parameter prediction according to the frequency domain representation of the sample speech frame, and outputs a predicted glottal parameter. Then, the predicted glottal parameter is compared with the glottal parameter corresponding to the original speech signal in the sample speech frame. When the two are inconsistent, a parameter of the first neural network is adjusted until the predicted glottal parameter outputted by the first neural network according to the frequency domain representation of the sample speech frame is consistent with the glottal parameter corresponding to the original speech signal in the sample speech frame. After the training ends, the first neural network acquires the capability of accurately predicting a glottal parameter corresponding to an original speech signal in an inputted speech frame according to a frequency domain representation of the speech frame.

In some embodiments of the present disclosure, due to the correlation between speech frames, the frequency domain feature similarity between two neighboring speech frames is high. Therefore, a glottal parameter corresponding to a target speech frame can be predicted with reference to a glottal parameter corresponding to a historical speech frame before the target speech frame. In this embodiment, step 410 includes: performing glottal parameter prediction according to the frequency domain representation of the target speech frame by using a glottal parameter corresponding to the historical speech frame of the target speech frame as a reference, to obtain the glottal parameter corresponding to the target speech frame.

Due to the correlation between the historical speech frame and the target speech frame, there is a similarity between the glottal parameter corresponding to the historical speech frame of the target speech frame and the glottal parameter corresponding to the target speech frame. Therefore, a process of predicting the glottal parameter of the target speech frame can be supervised by using the glottal parameter corresponding to the original speech signal in the historical speech frame of the target speech frame as a reference, which can improve the accuracy rate of glottal parameter prediction.

In an embodiment of the present disclosure, a glottal parameter of a speech frame closer to the target speech frame has a higher similarity. Therefore, the accuracy rate of prediction can be further ensured by using a glottal parameter corresponding to a historical speech frame relatively close to the target speech frame as a reference. For example, a glottal parameter corresponding to a previous speech frame of the target speech frame can be used as a reference. In one embodiment, a quantity of historical speech frames used as a reference may be one or more, which can be selected according to actual needs.

A glottal parameter corresponding to the historical speech frame of the target speech frame may be a glottal parameter obtained by performing glottal parameter prediction on the historical speech frame. In other words, during the glottal parameter prediction, a glottal parameter prediction process of a current speech frame is supervised by multiplexing a glottal parameter predicted for the historical speech frame.

In some embodiments of the present disclosure, in a scenario of predicting a glottal parameter using a first neural network, in addition to using a frequency domain representation of a target speech frame as an input, a glottal parameter corresponding to a historical speech frame of a target speech frame is also used as an input of the first neural network for glottal parameter prediction. In this embodiment, step 410 includes: inputting the frequency domain representation of the target speech frame and the glottal parameter corresponding to the historical speech frame of the target speech frame into a first neural network, the first neural network being obtained by training according to a frequency domain representation of a sample speech frame, a glottal parameter corresponding to the sample speech frame, and a glottal parameter corresponding to a historical speech frame of the sample speech frame; and performing, by the first neural network, prediction according to the frequency domain representation of the target speech frame and the glottal parameter corresponding to the historical speech frame of the target speech frame, and outputting the glottal parameter corresponding to the target speech frame.

During training of the first neural network of this embodiment, the frequency domain representation of the sample speech frame and the glottal parameter corresponding to the historical speech frame of the sample speech frame are inputted into the first neural network. The first neural network outputs a predicted glottal parameter. When the outputted predicted glottal parameter is inconsistent with the glottal parameter corresponding to the original speech signal in the sample speech frame, a parameter of the first neural network is adjusted until the outputted predicted glottal parameter is consistent with the glottal parameter corresponding to the original speech signal in the sample speech frame. After the training ends, the first neural network acquires the capability of predicting, according to a frequency domain representation of a speech frame and a glottal parameter corresponding to a historical speech frame of the speech frame, a glottal parameter used for reconstructing an original speech signal in the speech frame.

Reference may be made to FIG. 4 again. Step 420: Determine a gain corresponding to the target speech frame according to a gain corresponding to a historical speech frame of the target speech frame.

A gain corresponding to a historical speech frame is a gain used for reconstructing an original speech signal in the historical speech frame. Likewise, the gain that corresponds to the target speech frame and that is predicted in step 420 is used for reconstructing the original speech signal in the target speech frame.

In some embodiments of the present disclosure, gain prediction may be performed on the target speech frame in a deep learning manner. That is, gain prediction is performed by using a constructed neural network model. To facilitate description, a neural network model used for performing gain prediction is referred to as a second neural network. The second neural network may be a model constructed by using a long short-term memory neural network, a convolutional neural network, a fully-connected neural network, or the like.

In an embodiment of the present disclosure, step 420 may include: inputting the gain corresponding to the historical speech frame of the target speech frame to a second neural network, the second neural network being obtained by training according to a gain corresponding to a sample speech frame and a gain corresponding to a historical speech frame of the sample speech frame; and outputting, by the second neural network, the target gain according to the gain corresponding to the historical speech frame of the target speech frame.

A signal indicated by the sample speech frame may be obtained by combining a known original speech signal and a known noise signal. Therefore, when the original speech signal is known, linear predictive analysis can be performed on the original speech signal, to correspondingly determine gains corresponding to the sample speech frames, that is, a gain used for reconstructing the original speech signal in the sample speech frame.

The gain corresponding to the historical speech frame of the target speech frame may be obtained by performing gain prediction by the second neural network for the historical speech frame. In other words, the gain predicted by the historical speech frame is multiplexed as an input of the second neural network model in a process of performing gain prediction on the target speech frame.

During training of the second neural network, the gain corresponding to the historical speech frame of the sample speech frame is inputted into the second neural network, and then, the second neural network performs gain prediction on the inputted gain corresponding to the historical speech frame of the sample speech frame, and outputs a predicted gain. Then, a parameter of the second neural network is adjusted according to the predicted gain and the gain corresponding to the sample speech frame. That is, when the predicted gain is inconsistent with the gain corresponding to the sample speech frame, the parameter of the second neural network is adjusted until the predicted gain outputted by the second neural network for the sample speech frame is consistent with the gain corresponding to the sample speech frame. After the foregoing training process, the second neural network can acquire the capability of predicting a gain corresponding to a speech frame according to a gain corresponding to a historical speech frame of the speech frame, so as to accurately perform gain prediction.

Step 430: Determine an excitation signal corresponding to the target speech frame according to the frequency domain representation of the target speech frame.

In step 430, the excitation signal prediction that is performed refers to predicting a corresponding excitation signal used for reconstructing the original speech signal in the target speech frame. Therefore, the excitation signal corresponding to the target speech frame may be used for reconstructing the original speech signal in the target speech frame.

In some embodiments of the present disclosure, excitation signal prediction may be performed in a deep learning manner. That is, excitation signal prediction is performed by using a constructed neural network model. To facilitate description, a neural network model used for performing excitation signal prediction is referred to as a third neural network. The third neural network may be a model constructed by using a long short-term memory neural network, a convolutional neural network, a fully-connected neural network, or the like.

In some embodiments of the present disclosure, step 430 may include: inputting the frequency domain representation of the target speech frame to a third neural network, the third neural network being obtained by training according to a frequency domain representation of a sample speech frame and a frequency domain representation of an excitation signal corresponding to the sample speech frame; and outputting, by the third neural network according to the frequency domain representation of the target speech frame, a frequency domain representation of the excitation signal corresponding to the target speech frame.

The excitation signal corresponding to the sample speech frame refers to an excitation signal used for reconstructing the original speech signal in the sample speech frame. The excitation signal corresponding to the sample speech frame can be determined by performing linear predictive analysis on the original speech signal in the sample speech frame. The frequency domain representation of the excitation signal may be an amplitude spectrum, a complex spectrum, or the like of the excitation signal, which is not specifically limited herein.

During training of the third neural network, the frequency domain representation of the sample speech frame is inputted into the third neural network model, and then, the third neural network performs excitation signal prediction according to the inputted frequency domain representation of the sample speech frame, and outputs a predicted frequency domain representation of the excitation signal. Further, a parameter of the third neural network is adjusted according to the frequency domain representation of the excitation signal and the frequency domain representation of the excitation signal corresponding to the sample speech frame. That is, when the frequency domain representation of the excitation signal is inconsistent with the frequency domain representation of the excitation signal corresponding to the sample speech frame, the parameter of the third neural network is adjusted until the predicted frequency domain representation of the excitation signal outputted by the third neural network for the sample speech frame is consistent with the frequency domain representation of the excitation signal corresponding to the sample speech frame. After the foregoing training process, the third neural network can acquire the capability of predicting an excitation signal corresponding to a speech frame according to a frequency domain representation of the speech frame, so as to accurately perform excitation signal prediction.

Step 440: Synthesize the glottal parameter corresponding to the target speech frame, the gain corresponding to the target speech frame, and the excitation signal corresponding to the target speech frame, to obtain an enhanced speech signal corresponding to the target speech frame.

After the glottal parameter corresponding to the target speech frame, the gain corresponding to the target speech frame, and the excitation signal corresponding to the target speech frame are obtained, linear predictive analysis can be performed based on the three parameters to implement synthesis, to obtain an enhanced signal corresponding to the target speech frame. Specifically, a glottal filter may be first constructed according to the glottal parameter corresponding to the target speech frame, and then, speech synthesis is performed according to the foregoing formula (1) with reference to the gain and the excitation signal that correspond to the target speech frame, to obtain an enhanced speech signal corresponding to the target speech frame.

Figure 5:
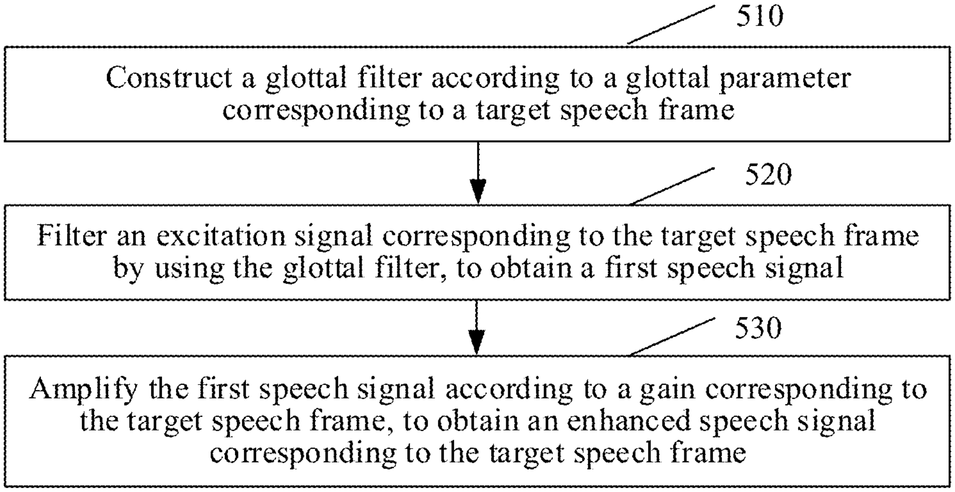
FIG. 5 is a flowchart of step 440 of the embodiment corresponding to FIG. 4 in an embodiment.

In some embodiments of the present disclosure, as shown in FIG. 5, step 440 includes steps 510 to 530:

Step 510: Construct a glottal filter according to the glottal parameter corresponding to the target speech frame.

When the glottal parameter is an LPC coefficient, the glottal filter can be constructed directly according to the foregoing formula (2). When the glottal filter is a K-order filter, the glottal parameter corresponding to the target speech frame includes a K-order LPC coefficient, that is, $a_1$, $a_2$, . . . , $a_K$, in the foregoing formula (2). In other embodiments, a constant 1 in the foregoing formula (2) may also be used as an LPC coefficient.

When the glottal parameter is an LSF parameter, the LSF parameter can be converted into an LPC coefficient, and then, glottal filter is correspondingly constructed according to the foregoing formula (2).

Step 520: Filter the excitation signal corresponding to the target speech frame by using the glottal filter, to obtain a first speech signal.

The filtering is convolution in time domain. Therefore, the foregoing process of filtering the excitation signal by using the glottal filter can be transformed to the time domain for processing. Then, based on the predicted frequency domain representation of the excitation signal corresponding to the target speech frame, the frequency domain representation of the excitation signal is transformed to the time domain, to obtain a time domain signal of the excitation signal corresponding to the target speech frame.

In the solution of the present disclosure, the target speech frame is a digital signal, including a plurality of sample points. The excitation signal is filtered by using the glottal filter. That is, convolution is performed on a historical sample point before a sample point and the glottal filter, to obtain a target signal value corresponding to the sample point. In some embodiments of the present disclosure, the target speech frame includes a plurality of sample points. The glottal filter is a K-order filter, K being a positive integer. The excitation signal includes excitation signal values respectively corresponding to the plurality of sample points in the target speech frame. According to the foregoing filtering process, step 520 includes: performing convolution on excitation signal values corresponding to K sample points before each sample point in the target speech frame and the K-order filter, to obtain a target signal value of the each sample point in the target speech frame; and combining target signal values corresponding to all the sample points in the target speech frame chronologically, to obtain the first speech signal. For an expression of the K-order filter, reference may be made to the foregoing formula (1). That is, for each sample point in the target speech frame, convolution is performed on excitation signal values corresponding to K sample points before the each sample point and the K-order filter, to obtain a target signal value corresponding to the each sample point.

It may be understood that for the first sample point in the target speech frame, a target signal value corresponding to the first sample point needs to be calculated by using excitation signal values of the last K sample points in the previous speech frame of the target speech frame. Likewise, for the second sample point in the target speech frame, convention needs to be performed on excitation signal values of the last (K−1) sample points in the previous speech frame of the target speech frame and an excitation signal value of the first sample point in the target speech frame and the K-order filter, to obtain a target signal value corresponding to the second sample point in the target speech frame.

In conclusion, step 520 requires participation of an excitation signal value corresponding to a historical speech frame of the target speech frame. A quantity of sample points in the required historical speech frame is related to an order of the glottal filter. That is, when the glottal filter is K-order, participation of excitation signal values corresponding to the last K sample points in the previous speech frame of the target speech frame is required.

Step 530: Amplify the first speech signal according to the gain corresponding to the target speech frame, to obtain the enhanced speech signal corresponding to the target speech frame.

Through steps 510 to 530, speech synthesis is performed on the glottal parameter, excitation signal, and gain predicted for the target speech frame, to obtain the enhanced speech signal of the target speech frame.

In the solution of the present disclosure, the glottal parameter and the excitation signal that are used for reconstructing the original speech signal in the target speech frame are predicted based on the frequency domain representation of the target speech frame, the gain used for reconstructing the original speech signal in the target speech frame is predicted based on the gain of the historical speech frame of the target speech frame, then, speech synthesis is performed the predicted glottal parameter, excitation signal, and gain that correspond to the target speech frame, which is equivalent to constructing the original speech signal in the target speech frame, and the signal obtained through synthesis is an enhanced speech signal corresponding to the target speech frame, thereby enhancing the speech frame and improving the quality of the speech signal.

In related art, speech enhancement may be performed through spectral estimation and spectral regression prediction. In the spectrum estimation speech enhancement manner, it is considered that a mixed speech includes a speech part and a noise part, and therefore, noise can be estimated by using a statistical models and the like. A spectrum corresponding to the noise is subtracted from a spectrum corresponding to the mixed speech, and the remaining is a speech spectrum. In this way, a clean speech signal is restored according to the spectrum obtained by subtracting the spectrum corresponding to the noise from the spectrum corresponding to the mixed speech. In the spectral regression prediction speech enhancement, a masking threshold corresponding to the speech frame is predicted through the neural network. The masking threshold reflects a ratio of a speech component and a noise component in each frequency point of the speech frame. Then, gain control is performed on the mixed signal spectrum according to the masking threshold, to obtain an enhanced spectrum.

The foregoing speech enhancement through spectral estimation and spectral regression prediction is based on estimation of a posterior probability of the noise spectrum, in which there may be inaccurate estimated noise. For example, because transient noise, such as keystroke noise, occurs transiently, an estimated noise spectrum is very inaccurate, resulting in a poor noise suppression effect. When noise spectrum prediction is inaccurate, if the original mixed speech signal is processed according to the estimated noise spectrum, distortion of a speech in the mixed speech signal or a poor noise suppression effect may be caused. Therefore, in this case, a compromise needs to be made between speech fidelity and noise suppression.

In the solution of the present disclosure, because the glottal parameter is strongly related to a glottal feature in a physical process of speech generation, synthesizing a speech according to the predicted glottal parameter effectively ensures a speech structure of the original speech signal in the target speech frame. Therefore, obtaining the enhanced speech signal of the target speech frame by performing synthesis on the predicted glottal parameter, excitation signal, and gain can effectively prevent the original speech signal in the target speech frame from being cut down, thereby effectively protecting the speech structure. Moreover, after the glottal parameter, excitation signal, and gain corresponding to the target speech frame are predicted, because the original noisy speech is not processed any more, there is no need to make a compromise between speech fidelity and noise suppression.

In some embodiments of the present disclosure, before step 410, the method further includes: obtaining a time domain signal of the target speech frame; and performing a time-frequency transform on the time domain signal of the target speech frame, to obtain the frequency domain representation of the target speech frame.

The time-frequency transform may be a short-time Fourier transform (STFT). The frequency domain representation may be an amplitude spectrum, a complex spectrum, or the like, which is not specifically limited herein.

Figure 6:
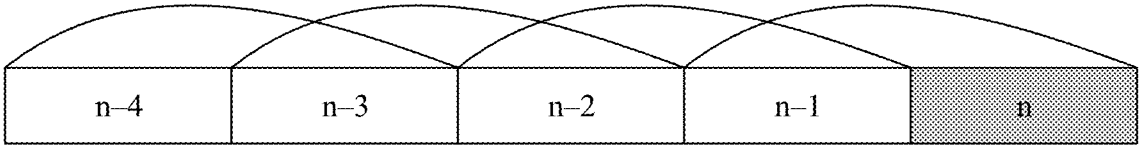
FIG. 6 is a schematic diagram of performing a short-time Fourier transform on a speech frame in a windowed overlapping manner according to an embodiment of the present disclosure.

In the short-time Fourier transform, a windowed overlapping operation is adopted to eliminate inter-frame non-smoothing. FIG. 6 is a schematic diagram of windowed overlapping in a short-time Fourier transform according to one embodiment of the present disclosure. In FIG. 6, a 50% windowed overlapping operation is adopted. When the short-time Fourier transform is aimed at 640 sample points, a quantity of overlapping samples (hop-size) of the window function is 320. The window function used for windowing may be a Hanning window, and certainly, may also be another window function, which is not specifically limited herein.

In other embodiments, a non-50% windowed overlapping operation may also be adopted. For example, when the short-time Fourier transform is aimed at 512 sample points, if a speech frame includes 320 sample points, it only needs to overlap 192 sample points of the previous speech frame.

In some embodiments of the present disclosure, the obtaining a time domain signal of the target speech frame includes: a second speech signal, the second speech signal being an acquired speech signal or a speech signal obtained by decoding an encoded speech; and framing the second speech signal, to obtain the time domain signal of the target speech frame.

In some embodiments, the second speech signal may be framed according to a set frame length. The frame length may be set according to actual needs. For example, the frame length may be set to 20 ms.

As described above, the solution of the present disclosure can be applied to a transmit end for speech enhancement or to a receive end for speech enhancement.

In a case the solution of the present disclosure is applied to the transmit end, the second speech signal is a speech signal acquired by the transmit end, and then the second speech signal is framed, to obtain a plurality of speech frames. After the speech frame is obtained by framing, each speech frame can be used as the target speech frame, and the target speech frame can be enhanced according to the foregoing process of steps 410 to 440. Further, after the enhanced speech signal corresponding to the target speech frame is obtained, the enhanced speech signal can also be encoded, so as to perform transmission based on the obtained encoded speech signal.

In an embodiment, because the directly acquired speech signal is an analog signal, to facilitate signal processing, before framing, the signal further needs to be digitalized. The acquired speech signal can be sampled according to a set sampling rate. The set sampling rate may be 16000 Hz, 8000 Hz, 32000 Hz, 48000 Hz, or the like, which can be set specifically according to actual needs.

When the solution of the present disclosure is applied to the receive end, the second speech signal is a speech signal obtained by decoding a received encoded speech signal, and after a plurality of speech frames are obtained by framing the second speech signal. The second speech signal is used as a target speech frame, and the target speech frame is enhanced according to the foregoing process of steps 410 to 440, to obtain an enhanced speech signal of the target speech frame. Further, the enhanced speech signal corresponding to the target speech frame may also be played. Because compared with the signal before the target speech frame is enhanced, the obtained enhanced speech signal already has noise removed, and quality of the speech signal is higher, for the user, the auditory experience is better.

The solution of the present disclosure is further described below with reference to certain embodiments.

Figure 7:
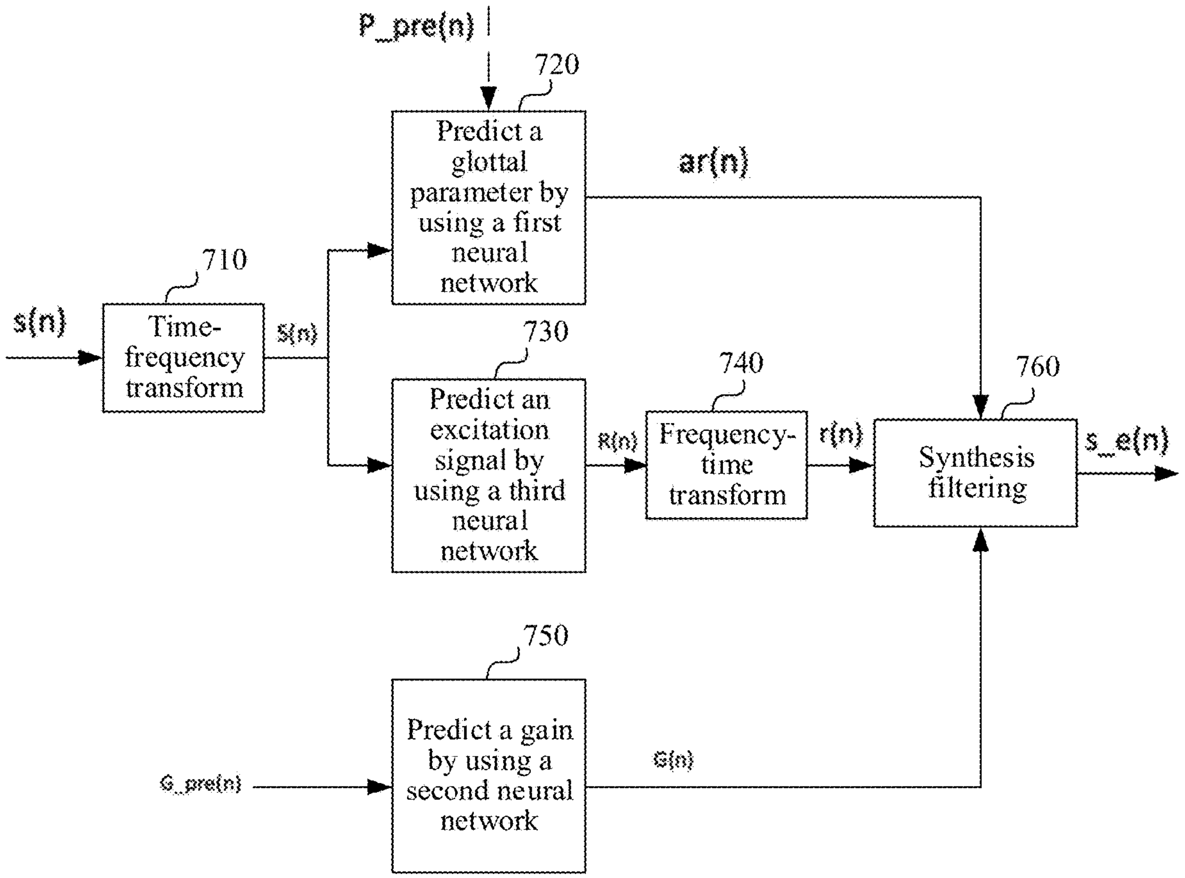
FIG. 7 is a flowchart of speech enhancement according to one embodiment of the present disclosure.

FIG. 7 is a flowchart of a speech enhancement method according to one embodiment. It is assumed that the $n^{th}$ speech frame is used as the target speech frame, and a time domain signal of the $n^{th}$ speech frame is s(n). As shown in FIG. 7, a time-frequency transform is performed on the $n^{th}$ speech frame in step 710 to obtain a frequency domain representation S(n) of the $n^{th}$ speech frame. S(n) may be an amplitude spectrum or a complex spectrum, which is not specifically limited herein.

After the frequency domain representation S(n) of the $n^{th}$ speech frame is obtained, the glottal parameter corresponding to the $n^{th}$ speech frame can be predicted through step 720, and an excitation signal corresponding to the target speech frame can be obtained through steps 730 and 740.

In step 720, only the frequency domain representation S(n) of the $n^{th}$ speech frame may be used as an input of the first neural network, or a glottal parameter P_pre(n) corresponding to a historical speech frame of the target speech frame and the frequency domain representation S(n) of the $n^{th}$ speech frame may be used as inputs of the first neural network. The first neural network may perform glottal parameter prediction based on the inputted information, to obtain a glottal parameter ar(n) corresponding to the $n^{th}$ speech frame.

In step 730, the frequency domain representation S(n) of the $n^{th}$ speech frame is used as an input of the third neural network. The third neural network performs excitation signal prediction based on the inputted information, to output a frequency domain representation R(n) of an excitation signal corresponding to the $n^{th}$ speech frame. Based on this, a frequency-time transform may be performed in step 740 to transform the frequency domain representation R(n) of the excitation signal corresponding to the $n^{th}$ speech frame into a time domain signal r(n).

A gain corresponding to the $n^{th}$ speech frame is obtained through step 750. In step 750, a gain G_pre(n) of a historical speech frame of the $n^{th}$ speech frame is used as an input of the second neural network, and the second neural network correspondingly performs gain prediction to obtain a gain G_(n) corresponding to the $n^{th}$ speech frame.

After the glottal parameter ar(n), the excitation signal r(n), and the gain G_(n) that correspond to the $n^{th}$ speech frame are obtained, synthesis filtering is performed based on the three parameters in step 760, to obtain an enhanced speech signal s_e(n) corresponding to the $n^{th}$ speech frame. Specifically, speech synthesis can be performed according to the principle of linear predictive analysis. In a process of performing speech synthesis according to the principle of linear predictive analysis, information about a historical speech frame needs to be used. Specifically, a process of filtering the excitation signal by using the glottal filter is performing, for the $t^{th}$ sample point, convolution by using excitation signal values of previous p historical sample points thereof and a p-order glottal filter, to obtain a target signal value corresponding to the sample point. When the glottal filter is a 16-order digital filter, in a process of performing synthesis on the $n^{th}$ speech frame, information about the last p sample points in the $(n-1)^{th}$ frame also needs to be used.

Step 720, step 730, and step 750 are further described below with reference to example embodiments. Assuming that a sampling frequency of a to-be-processed speech signal is Fs=16000 Hz, and a frame length is 20 ms, each speech frame includes 320 sample points. It is assumed that the short-time Fourier transform performed in this method uses 640 sample points and has 320 sample points overlapped. In addition, it is further assumed that the glottal parameter is a line spectral frequency coefficient, that is, the glottal parameter corresponding to the $n^{th}$ speech frame is ar(n), a corresponding LSF parameter is LSF(n), and the glottal filter is set to a 16-order filter.

Figure 8:
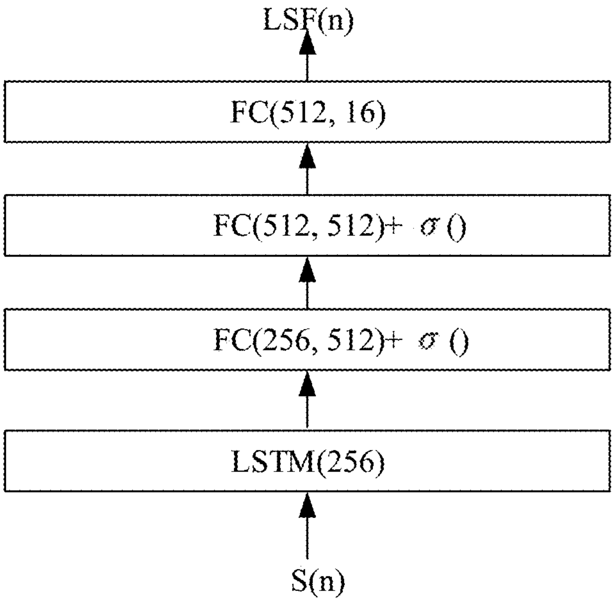
FIG. 8 is a schematic diagram of a first neural network according to an embodiment of the present disclosure.

FIG. 8 is a schematic diagram of a first neural network according to one embodiment. As shown in FIG. 8, the first neural network includes one long short-term memory (LSTM) layer and three cascaded fully connected (FC) layers. The LSTM layer is a hidden layer, including 256 units, and an input of the LSTM layer is the frequency domain representation S(n) of the $n^{th}$ speech frame. In this embodiment, the input of the LSTM layer is a 321-dimensional STFT coefficient. In the three cascaded FC layers, an activation function σ( ) is set in the first two FC layers. The set activation function is used for improving a nonlinear expression capability of the first neural network. No activation function is set in the last FC layer, the last FC layer is used as a classifier to perform classification and outputting. As shown in FIG. 8, the three FC layers include 512, 512, and 16 units respectively from bottom to top, and an output of the last FC layer is a 16-dimensional line spectral frequency coefficient LSF(n) corresponding to the $n^{th}$ speech frame, that is, a 16-order line spectral frequency coefficient.

Figure 9:
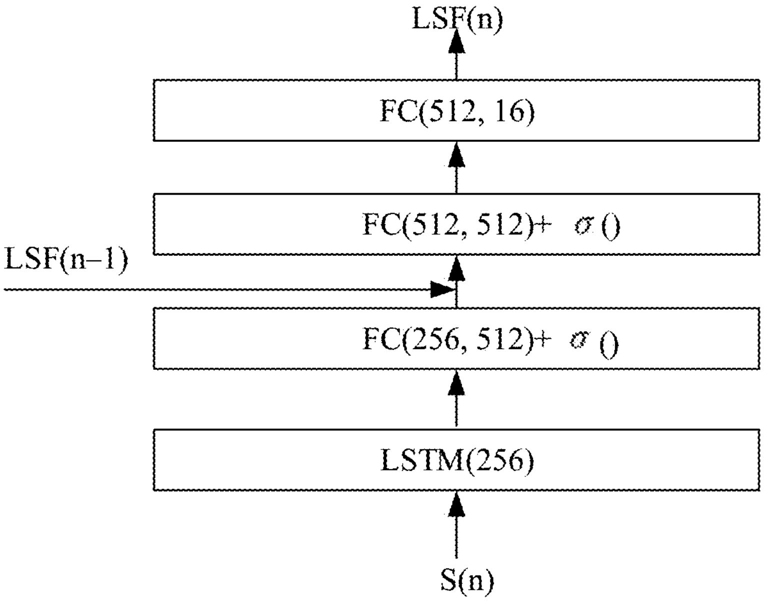
FIG. 9 is a schematic diagram of an input and an output of a first neural network according to another embodiment of the present disclosure.

FIG. 9 is a schematic diagram of an input and an output of a first neural network according to another embodiment. The structure of the first neural network in FIG. 9 is the same as that in FIG. 8. Compared with FIG. 8, the input of the first neural network in FIG. 9 further includes a line spectral frequency coefficient LSF(n−1) of the previous speech frame (that is, the $(n-1)^{th}$ frame) of the $n^{th}$ frame speech frame. As shown in FIG. 9, the line spectral frequency coefficient LSF(n−1) of the previous speech frame of the $n^{th}$ speech frame is embedded in the second FC layer as reference information. Due to an extremely high similarity between LSF parameters of two neighboring speech frames, when the LSF parameter corresponding to the historical speech frame of the $n^{th}$ speech frame is used as reference information, the accuracy rate of the LSF parameter prediction can be improved.

Figure 10:
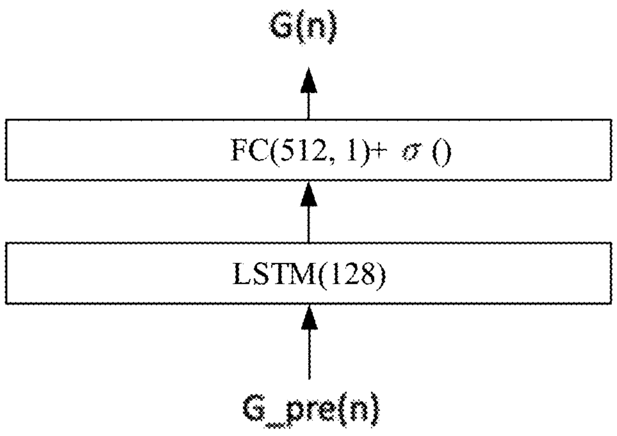
FIG. 10 is a schematic diagram of a second neural network according to an embodiment of the present disclosure.

FIG. 10 is a schematic diagram of a second neural network according to one embodiment. As shown in FIG. 10, the second neural network includes one LSTM layer and one FC layer. The LSTM layer is a hidden layer, including 128 units. An input of the FC layer is a 512-dimensional vector, and an output thereof is a 1-dimensional gain. In one embodiment, the historical speech frame gain G_pre(n) of the $n^{th}$ speech frame can be defined as gains corresponding to the first four speech frames of the $n^{th}$ speech frame, that is:

$$G\_pre(n)=\{G(n-1),G(n-2),G(n-3),G(n-4)\}.$$

Certainly, a quantity of historical speech frames selected for gain prediction is not limited to the foregoing example, and can be specifically selected according to actual needs.

In structures of the first neural network and the second neural network shown above, the network presents an M-to-N mapping relationship (N<<M), that is, a dimension of inputted information of the neural network is M, and a dimension of outputted information thereof is N, which greatly simplifies the structures of the first neural network and the second neural network, and reduces the complexity of the neural network model.

Figure 11:
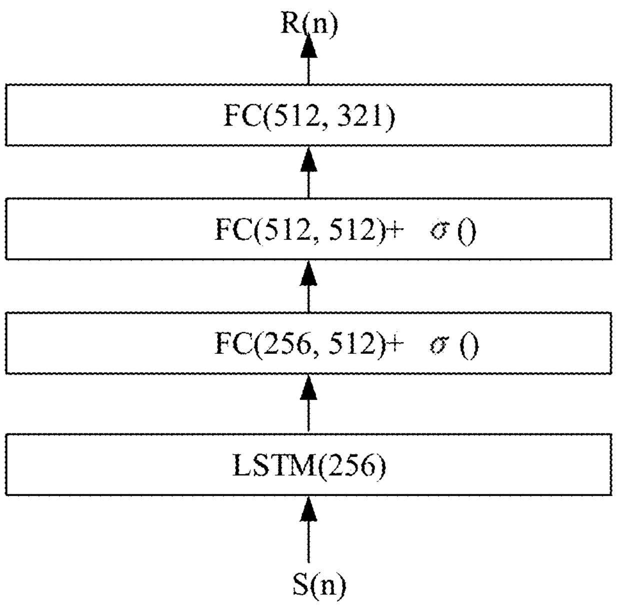
FIG. 11 is a schematic diagram of a third neural network according to an embodiment of the present disclosure.

FIG. 11 is a schematic diagram of a third neural network according to one embodiment. As shown in FIG. 11, the third neural network includes one LSTM layer and three FC layers. The LSTM layer is a hidden layer, including 256 units. An input of the LSTM layer is a 321-dimensional STFT coefficient S(n) corresponding to the $n^{th}$ speech frame. Quantities of units included in the three FC layers are 512, 512, and 321 respectively, and the last FC layer outputs a 321-dimensional frequency domain representation R(n) of an excitation signal corresponding to the $n^{th}$ speech frame. From bottom to top, the first two FC layers in the three FC layers have an activation function set therein, and are configured to improve a nonlinear expression capability of the model, and the last FC layer has no activation function set therein, and is configured to perform classification and outputting.

Structures of the first neural network, the second neural network, and the third neural network shown in FIG. 8-11 are merely illustrative examples. In other embodiments, a corresponding network structure may also be set in an open source platform of deep learning and is trained correspondingly.

The following introduces the apparatus embodiment of the present disclosure, which can be used for performing the method in the foregoing embodiments of the present disclosure. For details not disclosed in the apparatus embodiment of the present disclosure, reference may be made to the foregoing method embodiments in the present disclosure.

Figure 12:
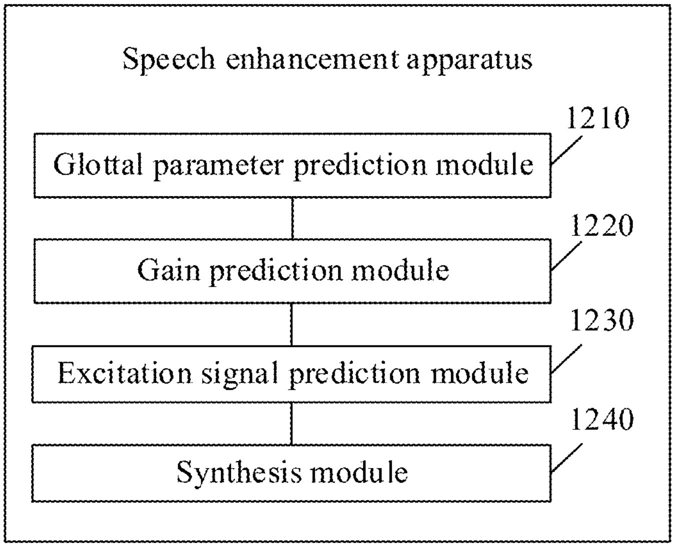
FIG. 12 is a block diagram of a speech enhancement apparatus according to an embodiment of the present disclosure.

FIG. 12 is a block diagram of a speech enhancement apparatus according to an embodiment. As shown in FIG. 12, the speech enhancement apparatus includes:

a glottal parameter prediction module 1210, configured to determine a glottal parameter corresponding to a target speech frame according to a frequency domain representation of the target speech frame;

a gain prediction module 1220, configured to determine a gain corresponding to the target speech frame according to a gain corresponding to a historical speech frame of the target speech frame;

an excitation signal prediction module 1230, configured to determine an excitation signal corresponding to the target speech frame according to the frequency domain representation of the target speech frame; and a synthesis module 1240, configured to perform synthesis on the glottal parameter corresponding to the target speech frame, the gain corresponding to the target speech frame, and the excitation signal corresponding to the target speech frame, to obtain an enhanced speech signal corresponding to the target speech frame.

In some embodiments of the present disclosure, the synthesis module 1240 includes: a glottal filter construction unit, configured to construct a glottal filter according to the glottal parameter corresponding to the target speech frame; a filter unit, configured to filtering the excitation signal corresponding to the target speech frame by using the glottal filter, to obtain a first speech signal; and an amplification unit, configured to amplify the first speech signal according to the gain corresponding to the target speech frame, to obtain the enhanced speech signal corresponding to the target speech frame.

In some embodiments of the present disclosure, the target speech frame includes a plurality of sample points. The glottal filter is a K-order filter, K being a positive integer. The excitation signal includes excitation signal values respectively corresponding to the plurality of sample points in the target speech frame. The filter unit includes: a convolution unit, configured to perform convolution on excitation signal values corresponding to K sample points before each sample point in the target speech frame and the K-order filter, to obtain a target signal value of the each sample point in the target speech frame; and a combination unit, configured to combine target signal values corresponding to all the sample points in the target speech frame chronologically, to obtain the first speech signal. In some embodiments of the present disclosure, the glottal filter is a K-order filter, and the glottal parameter includes a K-order line spectral frequency parameter or a K-order linear prediction coefficient.

In some embodiments of the present disclosure, the glottal parameter prediction module 1210 includes: a first input unit, configured to input the frequency domain representation of the target speech frame into a first neural network, the first neural network being obtained by training according to a frequency domain representation of a sample speech frame and a glottal parameter corresponding to the sample speech frame; and a first output unit, configured to output, by the first neural network according to the frequency domain representation of the target speech frame, the glottal parameter corresponding to the target speech frame.

In some embodiments of the present disclosure, the glottal parameter prediction module 1210 is further configured to perform glottal parameter prediction according to the frequency domain representation of the target speech frame by using a glottal parameter corresponding to the historical speech frame of the target speech frame as a reference, to obtain the glottal parameter corresponding to the target speech frame.

In some embodiments of the present disclosure, the glottal parameter prediction module 1210 includes: a second input unit, configured to input the frequency domain representation of the target speech frame and the glottal parameter corresponding to the historical speech frame of the target speech frame into a first neural network, the first neural network being obtained by training according to a frequency domain representation of a sample speech frame, a glottal parameter corresponding to the sample speech frame, and a glottal parameter corresponding to a historical speech frame of the sample speech frame; and a second output unit, configured to perform, by the first neural network, prediction according to the frequency domain representation of the target speech frame and the glottal parameter corresponding to the historical speech frame of the target speech frame, and output the glottal parameter corresponding to the target speech frame.

In some embodiments of the present disclosure, the gain prediction module 1220 includes: a third input unit, configured to input the gain corresponding to the historical speech frame of the target speech frame to a second neural network, the second neural network being obtained by training according to a gain corresponding to a sample speech frame and a gain corresponding to a historical speech frame of the sample speech frame; and a third output unit, configured to output, by the second neural network, the target gain according to the gain corresponding to the historical speech frame of the target speech frame.

In some embodiments of the present disclosure, the excitation signal prediction module 1230 includes: a fourth input unit, configured to input the frequency domain representation of the target speech frame to a third neural network, the third neural network being obtained by training according to a frequency domain representation of a sample speech frame and a frequency domain representation of an excitation signal corresponding to the sample speech frame; and a fourth output unit, configured to output, by the third neural network according to the frequency domain representation of the target speech frame, a frequency domain representation of the excitation signal corresponding to the target speech frame.

In some embodiments of the present disclosure, the speech enhancement apparatus further includes: an obtaining module, configured to obtaining a time domain signal of the target speech frame; and a time-frequency transform module, configured to perform a time-frequency transform on the time domain signal of the target speech frame, to obtain the frequency domain representation of the target speech frame.

In some embodiments of the present disclosure, the obtaining module is further configured to obtain a second speech signal, the second speech signal being an acquired speech signal or a speech signal obtained by decoding an encoded speech; and frame the second speech signal, to obtain the time domain signal of the target speech frame.

In some embodiments of the present disclosure, the speech enhancement apparatus further includes a processing module, configured to play or encode and transmit the enhanced speech signal corresponding to the target speech frame.

Figure 13:
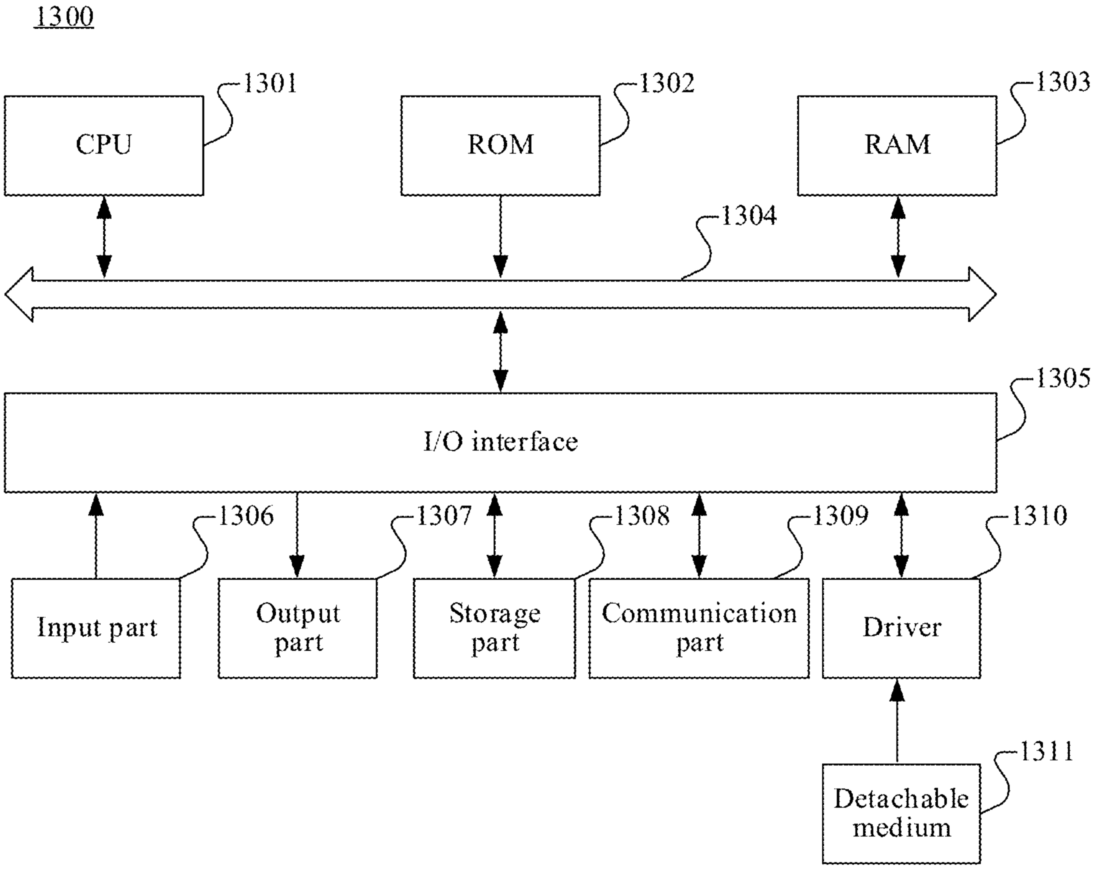
FIG. 13 is a schematic structural diagram of a computer system adapted to implement an electronic device according to an embodiment of the present disclosure.

FIG. 13 is a schematic structural diagram of a computer system adapted to implement an electronic device according to an embodiment of the present disclosure.

The computer system 1300 of the electronic device shown in FIG. 13 is merely an example, and does not constitute any limitation on functions and use ranges of the embodiments of the present disclosure.

As shown in FIG. 13, the computer system 1300 includes a central processing unit (CPU) 1301, which may perform various suitable actions and processing based on a program stored in a read-only memory (ROM) 1302 or a program loaded from a storage part 1308 into a random access memory (RAM) 1303, for example, perform the method in the foregoing embodiments. The RAM 1303 further stores various programs and data required for operating the system. The CPU 1301, the ROM 1302, and the RAM 1303 are connected to each other by a bus 1304. An input/output (I/O) interface 1305 is also connected to the bus 1304.

The following components are connected to the I/O interface 1305 includes an input part 1306 including a keyboard, a mouse, or the like; an output part 1307 including a cathode ray tube (CRT), a liquid crystal display (LCD), a speaker, or the like; a storage part 1308 including hard disk, or the like; and a communication part 1309 including a network interface card such as a local area network (LAN) card, a modem, or the like. The communication part 1309 performs communication processing by using a network such as the Internet. A driver 1310 is also connected to the I/O interface 1305 as required. A removable medium 1311, such as a magnetic disk, an optical disc, a magneto-optical disk, or a semiconductor memory, is installed on the driver 1310 as required, so that a computer program read from the removable medium is installed into the storage part 1308 as required.

Particularly, according to an embodiment of the present disclosure, the processes described in the following by referring to the flowcharts may be implemented as computer software programs. For example, the embodiments of the present disclosure include a computer program product, the computer program product includes a computer program carried on a computer-readable medium, and the computer program includes program code used for performing the methods shown in the flowcharts. In such an embodiment, by using the communication part 1309, the computer program may be downloaded and installed from a network, and/or installed from the removable medium 1311. When the computer program is executed by the CPU 1301, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal being in a baseband or propagated as at least a part of a carrier wave, and carries computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in the block diagram or the flowchart, and a combination of boxes in the block diagram or the flowchart may be implemented by using a dedicated hardware-based system that performs a specified function or operation, or may be implemented by using a combination of dedicated hardware and computer instructions.

A related unit described in the embodiments of the present disclosure may be implemented in a software manner, or may be implemented in a hardware manner, and the unit described may also be set in a processor. Names of the units do not constitute a limitation on the units in a specific case.

In another aspect, the present disclosure further provides a computer-readable storage medium. The computer-readable storage medium may be included in the electronic device described in the foregoing embodiments, or may exist alone without being assembled into the electronic device. The computer-readable storage medium carries computer-readable instructions. The computer-readable instructions, when executed by a processor, implement the method in any one of the foregoing embodiments.

According to an aspect of the present disclosure, an electronic device is further provided, including: a processor; a memory, storing computer-readable instructions, the computer-readable instructions, when executed by the processor, implementing the method in any one of the foregoing embodiments.

According to an aspect of the embodiments of the present disclosure, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method in any one of the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions according to the implementations of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of the present disclosure.

After considering the specification and practicing the disclosed embodiments, a person skilled in the art may easily conceive of other implementations of the present disclosure. The present disclosure is intended to cover any variations, uses or adaptive changes of the present disclosure. Such variations, uses or adaptive changes follow the general principles of the present disclosure, and include well-known knowledge and conventional technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A speech enhancement method, executed by a computer device, comprising:

determining a glottal parameter corresponding to a target speech frame according to a frequency domain representation of the target speech frame;

determining a gain corresponding to the target speech frame according to a gain corresponding to a historical speech frame of the target speech frame;

determining an excitation signal corresponding to the target speech frame according to the frequency domain representation of the target speech frame, comprising:

inputting the frequency domain representation of the target speech frame to a target neural network, the target neural network being trained according to a frequency domain representation of a sample speech frame and a frequency domain representation of an excitation signal corresponding to the sample speech frame; and outputting, by the target neural network according to the frequency domain representation of the target speech frame, a frequency domain representation of the excitation signal corresponding to the target speech frame; and synthesizing the glottal parameter corresponding to the target speech frame, the gain corresponding to the target speech frame, and the excitation signal corresponding to the target speech frame, to obtain an enhanced speech signal corresponding to the target speech frame.

2. The method according to claim 1, wherein the synthesizing the glottal parameter corresponding to the target speech frame, the gain corresponding to the target speech frame, and the excitation signal corresponding to the target speech frame, to obtain the enhanced speech signal corresponding to the target speech frame, comprises:

constructing a glottal filter according to the glottal parameter corresponding to the target speech frame;

filtering the excitation signal corresponding to the target speech frame by using the glottal filter, to obtain a first speech signal; and amplifying the first speech signal according to the gain corresponding to the target speech frame, to obtain the enhanced speech signal corresponding to the target speech frame.

3. The method according to claim 2, wherein the target speech frame comprises a plurality of sample points; the glottal filter is a K-order filter, K being a positive integer; the excitation signal comprises excitation signal values respectively corresponding to the plurality of sample points in the target speech frame; and the filtering the excitation signal corresponding to the target speech frame by using the glottal filter, to obtain the first speech signal, comprises:

for one sample point in the target speech frame, performing convolution on excitation signal values corresponding to K sample points before the sample point in the target speech frame and the K-order filter, to obtain a target signal value of the sample point in the target speech frame; and combining target signal values corresponding to the sample points in the target speech frame chronologically, to obtain the first speech signal.

4. The method according to claim 2, wherein the glottal filter is a K-order filter, and the glottal parameter comprises a K-order line spectral frequency parameter or a K-order linear prediction coefficient, K being a positive integer.

5. The method according to claim 1, wherein the determining the glottal parameter corresponding to a target speech frame according to the frequency domain representation of the target speech frame comprises:

inputting the frequency domain representation of the target speech frame into a first neural network, the first neural network being obtained by training according to the frequency domain representation of the sample speech frame and a glottal parameter corresponding to the sample speech frame; and outputting, by the first neural network according to the frequency domain representation of the target speech frame, the glottal parameter corresponding to the target speech frame.

6. The method according to claim 1, wherein the determining the glottal parameter corresponding to a target speech frame according to the frequency domain representation of the target speech frame comprises:

determining the glottal parameter corresponding to the target speech frame by using a glottal parameter corresponding to the historical speech frame of the target speech frame as a reference.

7. The method according to claim 6, wherein the determining the glottal parameter corresponding to the target speech frame by using the glottal parameter corresponding to the historical speech frame of the target speech frame as a reference, comprises:

inputting the frequency domain representation of the target speech frame and the glottal parameter corresponding to the historical speech frame of the target speech frame into a first neural network, the first neural network being obtained by training according to the frequency domain representation of the sample speech frame, a glottal parameter corresponding to the sample speech frame, and a glottal parameter corresponding to a historical speech frame of the sample speech frame; and performing, by the first neural network, prediction according to the frequency domain representation of the target speech frame and the glottal parameter corresponding to the historical speech frame of the target speech frame, and outputting the glottal parameter corresponding to the target speech frame.

8. The method according to claim 1, wherein the determining the gain corresponding to the target speech frame according to the gain corresponding to the historical speech frame of the target speech frame comprises:

inputting the gain corresponding to the historical speech frame of the target speech frame to a second neural network, the second neural network being obtained by training according to a gain corresponding to the sample speech frame and a gain corresponding to a historical speech frame of the sample speech frame; and outputting, by the second neural network, a target gain according to the gain corresponding to the historical speech frame of the target speech frame.

9. The method according to claim 1, wherein the method further comprises:

obtaining a time domain signal of the target speech frame;

performing a time-frequency transform on the time domain signal of the target speech frame, to obtain the frequency domain representation of the target speech frame.

10. The method according to claim 9, wherein the obtaining the time domain signal of the target speech frame comprises:

obtaining a second speech signal, the second speech signal being an acquired speech signal or a speech signal obtained by decoding an encoded speech; and framing the second speech signal, to obtain the time domain signal of the target speech frame.

11. The method according to claim 1, wherein the method further comprises:

playing or encoding and transmitting the enhanced speech signal corresponding to the target speech frame.

12. A speech enhancement apparatus, comprising:

a processor; and a memory, storing computer-readable instructions, the computer-readable instructions, when executed by the processor, implementing:

determining a glottal parameter corresponding to a target speech frame according to a frequency domain representation of the target speech frame;

determining a gain corresponding to the target speech frame according to a gain corresponding to a historical speech frame of the target speech frame;

determining an excitation signal corresponding to the target speech frame according to the frequency domain representation of the target speech frame, comprising:

inputting the frequency domain representation of the target speech frame to a target neural network, the target neural network being trained according to a frequency domain representation of a sample speech frame and a frequency domain representation of an excitation signal corresponding to the sample speech frame; and outputting, by the target neural network according to the frequency domain representation of the target speech frame, a frequency domain representation of the excitation signal corresponding to the target speech frame; and synthesizing the glottal parameter corresponding to the target speech frame, the gain corresponding to the target speech frame, and the excitation signal corresponding to the target speech frame, to obtain an enhanced speech signal corresponding to the target speech frame.

13. The apparatus according to claim 12, wherein the synthesizing the glottal parameter corresponding to the target speech frame, the gain corresponding to the target speech frame, and the excitation signal corresponding to the target speech frame, to obtain the enhanced speech signal corresponding to the target speech frame, comprises:

constructing a glottal filter according to the glottal parameter corresponding to the target speech frame;

filtering the excitation signal corresponding to the target speech frame by using the glottal filter, to obtain a first speech signal; and amplifying the first speech signal according to the gain corresponding to the target speech frame, to obtain the enhanced speech signal corresponding to the target speech frame.

14. The apparatus according to claim 13, wherein the target speech frame comprises a plurality of sample points; the glottal filter is a K-order filter, K being a positive integer; the excitation signal comprises excitation signal values respectively corresponding to the plurality of sample points in the target speech frame; and the filtering the excitation signal corresponding to the target speech frame by using the glottal filter, to obtain the first speech signal, comprises:

for one sample point in the target speech frame, performing convolution on excitation signal values corresponding to K sample points before the sample point in the target speech frame and the K-order filter, to obtain a target signal value of the sample point in the target speech frame; and combining target signal values corresponding to the sample points in the target speech frame chronologically, to obtain the first speech signal.

15. The apparatus according to claim 13, wherein the glottal filter is a K-order filter, and the glottal parameter comprises a K-order line spectral frequency parameter or a K-order linear prediction coefficient, K being a positive integer.

16. The apparatus according to claim 12, wherein the determining the glottal parameter corresponding to a target speech frame according to the frequency domain representation of the target speech frame comprises:

inputting the frequency domain representation of the target speech frame into a first neural network, the first neural network being obtained by training according to the frequency domain representation of the sample speech frame and a glottal parameter corresponding to the sample speech frame; and outputting, by the first neural network according to the frequency domain representation of the target speech frame, the glottal parameter corresponding to the target speech frame.

17. The apparatus according to claim 12, wherein the determining the glottal parameter corresponding to a target speech frame according to the frequency domain representation of the target speech frame comprises:

determining the glottal parameter corresponding to the target speech frame by using a glottal parameter corresponding to the historical speech frame of the target speech frame as a reference.

18. The apparatus according to claim 17, wherein the determining the glottal parameter corresponding to the target speech frame by using the glottal parameter corresponding to the historical speech frame of the target speech frame as a reference, comprises:

inputting the frequency domain representation of the target speech frame and the glottal parameter corresponding to the historical speech frame of the target speech frame into a first neural network, the first neural network being obtained by training according to the frequency domain representation of the sample speech frame, a glottal parameter corresponding to the sample speech frame, and a glottal parameter corresponding to a historical speech frame of the sample speech frame; and performing, by the first neural network, prediction according to the frequency domain representation of the target speech frame and the glottal parameter corresponding to the historical speech frame of the target speech frame, and outputting the glottal parameter corresponding to the target speech frame.

19. A non-transitory computer-readable storage medium, storing computer-readable instructions, the computer-readable instructions, when executed by a processor, implementing:

determining a glottal parameter corresponding to a target speech frame according to a frequency domain representation of the target speech frame;

determining a gain corresponding to the target speech frame according to a gain corresponding to a historical speech frame of the target speech frame;

determining an excitation signal corresponding to the target speech frame according to the frequency domain representation of the target speech frame, comprising:

inputting the frequency domain representation of the target speech frame to a target neural network, the target neural network being trained according to a frequency domain representation of a sample speech frame and a frequency domain representation of an excitation signal corresponding to the sample speech frame; and outputting, by the target neural network according to the frequency domain representation of the target speech frame, a frequency domain representation of the excitation signal corresponding to the target speech frame; and synthesizing the glottal parameter corresponding to the target speech frame, the gain corresponding to the target speech frame, and the excitation signal corresponding to the target speech frame, to obtain an enhanced speech signal corresponding to the target speech frame.

* * * * *